United States Patent
Von Helmolt et al.

(10) Patent No.: US 8,478,649 B2
(45) Date of Patent: Jul. 2, 2013

(54) SYSTEMS AND METHODS FOR CREATION OF STRUCTURED ORDER ITEMS DURING AVAILABILITY CHECK

(75) Inventors: Hans-Ulrich Von Helmolt, Heidelberg (DE); Carsten Kreuels, Contwig (DE); Wolfram Schick, Karlsruhe (DE)

(73) Assignee: SAP AG, Walldorf (DE)

( * ) Notice: Subject to any disclaimer, the term of this patent is extended or adjusted under 35 U.S.C. 154(b) by 1740 days.

(21) Appl. No.: 11/633,408

(22) Filed: Dec. 5, 2006

(65) Prior Publication Data
US 2007/0130029 A1 Jun. 7, 2007

(30) Foreign Application Priority Data

Dec. 5, 2005 (EP) ..................................... 05111710

(51) Int. Cl.
*G06G 1/14* (2006.01)
*G06Q 10/00* (2012.01)

(52) U.S. Cl.
USPC ............................................. 705/22; 705/28

(58) Field of Classification Search
None
See application file for complete search history.

(56) References Cited

U.S. PATENT DOCUMENTS

| | | | |
|---|---|---|---|
| 6,970,837 B1* | 11/2005 | Walker et al. | 705/26 |
| 7,343,212 B1* | 3/2008 | Brearley et al. | 700/106 |
| 2002/0095307 A1* | 7/2002 | Greamo et al. | 705/1 |

* cited by examiner

*Primary Examiner* — Fahd Obeid
(74) *Attorney, Agent, or Firm* — Finnegan, Henderson, Farabow, Garrett & Dunner LLP

(57) ABSTRACT

Methods and systems are provided for creating and managing structured order items. In one embodiment, a method is provided for creating and managing structured order items according to a customer order within a supply chain management system, wherein the customer order specifies a plurality of products and required quantities thereof. The method comprises the steps of checking availability of the required quantity of the products, and comparing the available quantity of the products with the ordered quantity of the products. The method further comprises replacing the ordered product by a variant product, if the available quantity of the product does not correspond to the ordered quantity of the product, the variant product comprising a plurality of replacement products. Additionally, the method includes creating structured order items according to the variant product, and updating the customer order to replace the ordered product with the structured order items.

23 Claims, 13 Drawing Sheets

SYSTEMS AND METHODS FOR CREATION OF STRUCTURED ORDER ITEMS DURING AVAILABILITY CHECK

BACKGROUND

1. Technical Field

The present invention generally relates to methods and systems for managing products within, for example, e-business systems. More particularly, the present invention relates to methods and systems for optimizing the order, delivery and transport processes of products from a supplier to a customer within a supply chain management system by considering the lifecycle of relevant products.

2. Background Information

Supply chain management comprises the process of coordinating the flow of goods, services, information and/or finances between the involved parties, such as manufactures, suppliers, wholesalers, retailers, and consumers. This process may include, among others, order processing, information feedback, and delivering the ordered goods and/or services in a timely manner.

In current supply chain management systems, the availability of an ordered quantity of products is checked within an availability check process. This availability check process is based on a list comprising a plurality of locations which may be considered by the availability check. The list may be built by evaluating a plurality of available-to-promise (ATP) rules, wherein the ATP rules define the locations which have to be checked. In addition to the locations, it may be possible to define alternative products with the ATP rules, whereby it is only possible to define the replacement of one single product with one single alternative product.

SUMMARY

In view of the foregoing, systems and methods are disclosed herein for creating and managing structured order items according to a customer order within, for example, a supply chain management system. Systems and methods consistent with the present invention may be implemented to manage products and other items, while overcoming one or more of the above-mentioned drawbacks in the art.

In accordance with one embodiment, a computer-implemented method is provided for creating and managing structured order items according to a customer order within a supply chain management system, the customer order specifying a plurality of products and required quantities thereof. The method may comprise the steps of checking availability of the required quantity of the products, and comparing the available quantity of the products with the ordered quantity of the products. The method may further comprise the steps of replacing the ordered product by a variant product, if the available quantity of the product does not correspond to the ordered quantity of the product, the variant product comprising a plurality of replacement products, creating structured order items according to the variant product, and updating the customer order to replace the ordered product with the structured order items.

Further embodiments of the invention can comprise the following features. In accordance with an embodiment, the step of creating structured order items may further comprise performing an availability check for the variant product, determining the plurality of replacement products according to the variant product, if the availability check does not confirm the required quantity of the variant product, and performing an availability check for each determined replacement product according to the variant product.

The availability check for each determined replacement product may further comprise determining at least one alternative product for the replacement product if the availability check does not confirm the required quantity of the replacement product, and performing an availability check for the determined at least one alternative product.

The determination of the at least one alternative product for the replacement product may be performed based on a plurality of ATP rules, each ATP rule including product substitutions and/or location substitutions.

Furthermore, the replacement product may be a further variant product. Still further, the ordered product according to the customer order may be the variant product. The replacement product may comprise a quantity factor indicating the number of replacement products per variant product.

In accordance with another embodiment of the invention, the step of creating structured order items may further comprise building up a tree structure comprising the ordered product, the variant products, the replacement products, the alternative products and the relationships between them.

Furthermore, the plurality of replacement products according to the variant product may be represented by a KIT-Product. Replacement products according to the KIT-Product may depend on each other.

Furthermore, the plurality of replacement products according to the variant product may be represented by a One-to-Many-Product. In such a case, the replacement products according to the One-to-Many-Product may not depend on each other.

The determined replacement products may be correlated according to the KIT-product, whereby the minimum of the confirmed quantities of the replacement products defines the confirmed quantity for the other replacement products according to the KIT-product and the correlated result for the corresponding variant product.

In one embodiment, building up the tree structure may comprise the steps of creating an anchor item representative of the ordered product, creating a substitution requirement group comprising all substitution requirements according to the ordered product, inserting substitution requirements as placeholders for the variant products into the substitution requirement group, and linking the anchor item to the substitution requirement group. Building up the tree structure may further comprise creating component requirement groups for each inserted placeholder comprising substitution requirements for the corresponding variant products, linking the placeholders to the corresponding component requirement groups, creating further substitution requirement groups for the substitution requirements out of the component requirement groups comprising substitution requirements for the corresponding substitution requirements out of the component requirement groups, and linking the substitution requirements out of the component requirement groups to the corresponding further substitution requirement groups.

Further, the step of updating the customer order may comprise storing the tree structure in a plurality of interface tables, whereby the plurality of interface tables comprise at least a table REQ_GROUPS for storing the requirement groups, a table REQ for storing the requirements, a table REQ_ITEMS for storing the requirement items, and a table RES for storing the results, whereby the results represent the confirmations of the availability checks.

The plurality of interface tables may be linked together using a plurality of indices, whereby the results are linked to the respective requirement items, the requirement items are linked to the respective requirements, the requirements are linked to the respective requirement groups, the requirement groups are linked to the respective predecessor requirements, and the requirement groups are linked to the respective predecessor requirement item.

In accordance with another embodiment of the invention, a system may be provided for creating and managing structured order items according to a customer order comprising a plurality of products and required quantities thereof. The system may comprise means for storing data representing a plurality of products and a plurality of alternative products, means for storing data representing a plurality of variant products, each variant product consisting of a plurality of replacement products, means for storing a plurality of ATP rules, and means for checking the availability of ordered products, of variant products, of replacement products and of alternative products.

In accordance with an embodiment, the system may comprise a supply chain management system.

Further, the system may comprise means for building up a tree structure and a data storage device for storing a plurality interface tables, wherein the interface tables are linked together.

Embodiments of the invention also relate to a computer-readable medium comprising computer-executable instructions for performing methods consistent with the invention when loaded into a computer system.

Advantageously, embodiments of the present invention may be implemented such that a single product can be replaced with a variant product. The variant product can be one of a KIT-Product and a One-To-Many-Product. Furthermore, it is possible to transfer the complete resulting structure, comprising the variant product, into the order.

As a further advantage, embodiments of the invention may permit the complete structure of the variant product and its components to be visible in the order.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1A:
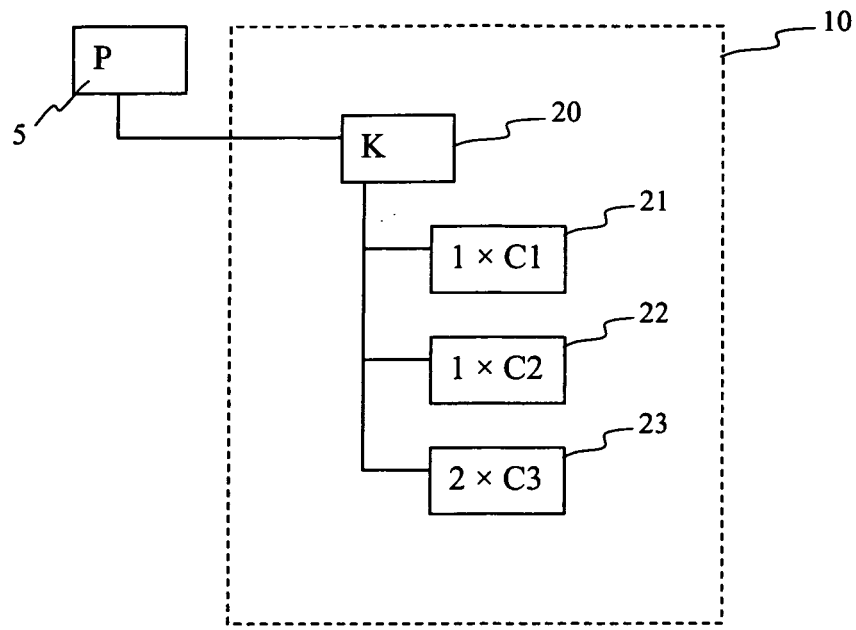
FIGS. 1a and 1b illustrate an exemplary KIT-Product and an exemplary One-To-Many-Product, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

In the manufacturing industry or in the spare parts business, the lifecycle of products or parts need to be modeled. For example, new variants of products are created or products become obsolete and are replaced by other products. Sometimes a single product consists of a set of several products or components which are to be assembled together or packed together before being shipped to the customer. A product which represents a set of components is denoted in the following as 'variant product'. A variant product may be a 'KIT'/ 'KIT-Product' or a 'One-to-Many-Product'. Both types of a variant product are described below with reference to, for example, FIGS. 1-3. It may also be possible that some products which have been sold in the past as single products are later sold as a list of several individual parts. For example, in the automotive industry, a complete transmission assembly product may be replaced with a list of individual transmission products. Regardless of which product is ordered, the availability check process for the ordered product should automatically replace the obsolete products or any unavailable products.

Furthermore, it is possible to fulfill a customer order of a plurality of products even if some ordered products are not available, but the components of these unavailable products are available. The supplier may use the available components for assembling or packing together the ordered products—such that a production process for the unavailable products may be avoided. This reduces warehouse charges, avoids additional production costs, and the customer order can be fulfilled closer in time.

Within a supply chain management system, a plurality of ATP rules define which locations have to be checked for the availability of the ordered products. The ATP rules may be stored within this supply chain management system. The determination of the relevant ATP rules may be done based on a plurality of criteria, for example customer or order related properties. The ATP rules may also define alternative products for products which are temporarily not available, for products for which successor products are available or for products which have to be replaced by a number of components. In one embodiment, it is also possible to define alternative products for components which are not available. Such alternative products may be single products or a product comprised of a set of several components (i.e., a variant product).

Furthermore, the ATP rules may define alternative product locations to be checked, if a product is not available during an availability check with a first product location.

A KIT 10, shown in FIG. 1a, is modeled as a variant product for a product 5 using "Integrated Product and Process Engineering" (iPPE). The iPPE may be a part of the supply chain management system. Integrated Product and Process Engineering enables the continual description of a product, from the design phase and production through to operative use.

As shown in the example of FIG. 1a, KIT 10 comprises a header product 20 and a plurality of components 21, 22, 23. The components of a KIT may depend on each other. This means that a KIT-Product can be only sold if all required components are available within one product location. The KIT-Product 10 is available only if the header product 20 is available as a single product or the components 21, 22, 23 are available, whereby the component 23 is needed two times in order to build the header product 20. For unconfirmed KIT-Products, the system may creates remaining requirements which may be checked for availability in further product locations.

Figure 1B:
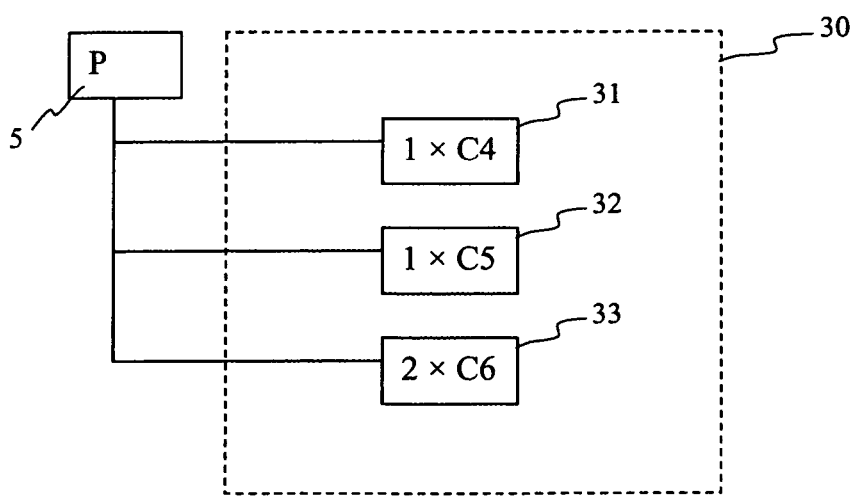

In a further embodiment, the iPPE may be used for modeling variant products without header products, the so called 'One-to-Many-Products'. FIG. 1b shows an exemplary variant product 30 for the product 5 without a header product. The components 31, 32, 33 of a variant product 30 do not depend on each other. In this case, the header product is represented by the original product 5. That means that a One-to-Many-Product can be confirmed by the availability check even if not all required components are available. For the unconfirmed components, the system may create remaining requirements which may be checked in further product locations.

In one embodiment, the components of a variant product are stored within the iPPE and are determined by evaluating a plurality of ATP rules. The evaluation process may return a substitution chain with the header product and its components. Furthermore, the components may comprise a quantity factor representing the number of components per header product. In the example of FIG. 1a, the quantity factor of the component 23 according to the header product 20 is 2. The relations between the header product and its components, including the quantity factors, are internally buffered.

In one embodiment, during the availability check, two parameters (as part of the check instruction and check control) define how the availability check for a variant product has to be done. These parameters are:
start production indicator, and
production type.

The start production indicator triggers the production process. It is part of the check instruction and may have different values, such as the following:

| 0 | availability check only; no production | Production is not active, only the availability check will be performed. In this case, the components according to a variant product are not determined. |
|---|---|---|
| 1 | availability check first; then production | Production is active and is performed only if the availability check confirms only a part of the required quantity. |
| 2 | production directly | Production is active and is performed without executing an availability check. |

According to one embodiment of the invention, the production type (as part of the check control) may have the value 'KIT'. In the case that production is active according to the start production indicator, the value 'KIT' triggers the determination of the components according to the KIT 10.

During the availability check, a tree structure, e.g., the ATP tree, is built up and is used to handle and manage requirements. In one embodiment, the ATP tree consists of four different object types: requirement groups, requirement subgroups, requirements and requirement items.

A requirement is an object that corresponds to an order item. A requirement consists of one or more requirement items. A requirement refers to, for example:
a product number; and
organizational units (e.g. location).

A requirement item is a tuple that consists of a requirements quantity and a requirements date. The requirement item describes the requirements quantity for a location-product on a requirements date. Each requirement item belongs to a requirement; on the other hand, a requirement contains one or more requirement items.

A requirement group and a requirement subgroup is a list of requirements. During an availability check new requirement groups can be generated.

The following examples 1 to 4 show how the ATP tree may be built up according to different settings for the start production indicator and the production type when a KIT-Product is involved in the substitution chain. The respective figures show only the requirement groups and the requirements. It is assumed that every requirement has exactly one requirement item.

Figure 2A:
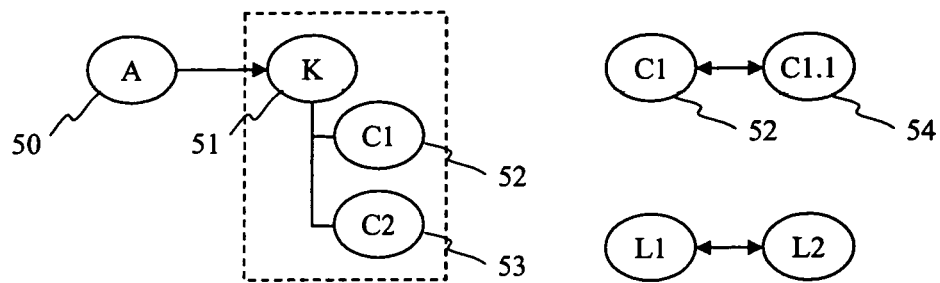
FIGS. 2a-2h illustrate an exemplary creation of an ATP tree for a KIT-Product, consistent with an embodiment of the present invention.

Examples 1 to 4 are based on the exemplary product substitution chain shown in FIG. 2a. Product A 50 is replaced by the KIT-Product K 51. The KIT-Product K 51 is modeled as a variant product using iPPE and includes components C1 52 and C2 53. Component C1 52 is replaced by product C1.1 54. Additionally, the location substitution list includes the first location L1 and the second location L2. That means that location L1 is replaced by location L2.

Example 1

Using the Following Check Instruction/Control:
input product—A 50;
start production indicator—the start production indicator is set equal to 0 (availability check only; no production);
production type—since the production indicator is 0 the production type is not relevant;
components—no availability check because start production indicator is set equal to 0.

Figure 2B:
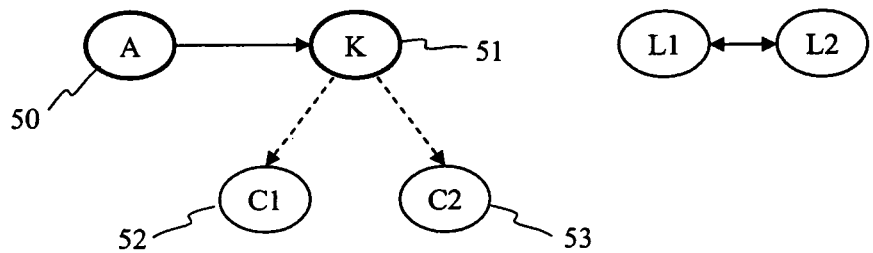

First, an anchor requirement group for product A 50 in location L1 is created. The product A 50 is checked and a rules evaluation is performed. The rules evaluation is performed for product A 50 and determines the substitution chain as shown in FIG. 2b. The location product list contains the products A 50 and the KIT-Product 51, as well as the locations L1 and L2. The components C1 52 and C2 53 for the KIT-Product 51 are buffered.

Figure 2C:
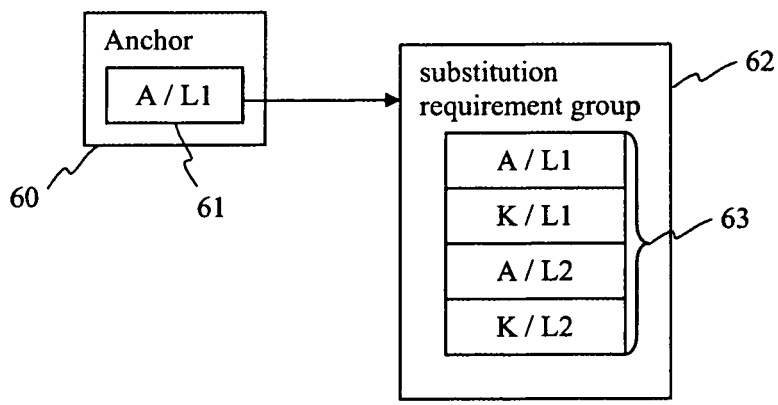

Then, a requirement group of type substitution is generated containing the requirements for all location products. The anchor requirement is linked to the substitution requirement group. The result is shown in FIG. 2c. The item 60 shows the anchor requirement group containing the product location A/L1 61. The substitution requirement group 62 contains the requirements 63 for all location products according to the locations L1 and L2 and the products A and K.

The items of the substitution requirement group are checked for availability. Because no production is activated (production indicator=0) a bill of material explosion for the KIT-Product is not performed and the components of the KIT-Product are not checked for availability.

A bill of material is a complete, structured list of the components that make up a product. The bill of material explosion determines all components of a bill of material and reflects the parent/child relationships and the quantity relationships between the parent and the child (component). The bill of material explosion may be also used to show the structure of a product or to show the total quantity of each component.

Example 2

Using the Following Check Instruction/Control:
  input product—A 50;
    start production indicator—the start production indicator is set equal to 1 (availability check first; then production);
    production type—KIT;
    components—no rules based availability check (no location or product substitution is performed).

First, an anchor requirement group for product A 50 in location L1 is created. The product A 50 is checked and a rules evaluation is performed. The rules evaluation is performed for product A 50 and determines the substitution chain as shown in FIG. 2*b*. The location product list contains the products A 50 and the KIT-Product 51 as well as the locations L1 and L2. The components C1 52 and C2 53 for the KIT-Product 51 are buffered.

Then, a requirement group of type substitution containing the requirements for all location products is generated. The anchor requirement is linked to the substitution requirement group.

Figure 2D:
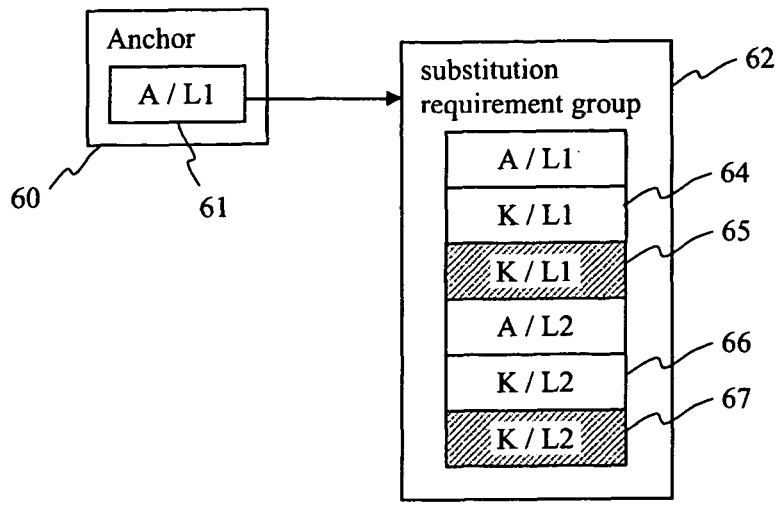

In this example, first the KIT-Product is checked for availability and then the components of the KIT-Product. As shown in FIG. 2*d*, for each KIT-Product according to the product locations L1 and L2 two requirements 64, 65 and 66, 67 respectively are generated within the substitution requirement group 62.

The first requirements 64, 66 are the requirements for the header product of the KIT-Product. These requirements 64, 66 are only checked for availability and no bill of material explosion is performed. The second requirements 65, 67 represent placeholder requirements which trigger the availability check for the components of the KIT-Product. For these requirements 65, 67 the header product of the KIT-Product is not checked for availability. Only a bill of material explosion is carried out according to the production type KIT and the components are checked for availability.

If start production indicator is set equal to 2 (production directly), only the placeholder requirements 65, 67 according to the KIT-Product are generated. These placeholder requirements 65, 67 are not checked for availability. The bill of material explosion is started immediately, and the components are determined and checked for availability.

The bill of material explosion leads to the creation of to component requirement groups.

Figure 2E:
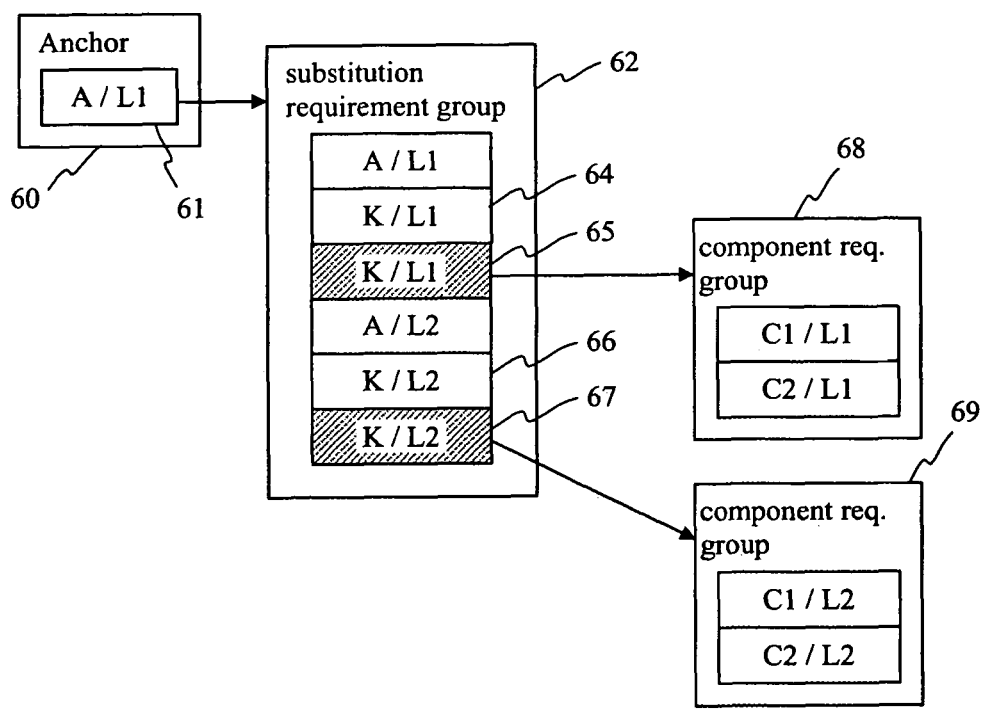

FIG. 2*e* shows the ATP tree after the component requirement groups 68, 69 are created an inserted into the ATP tree, according to one embodiment of the present invention. The substitution requirement 65 is linked to the component requirement group 68, and the substitution requirement 67 is linked to the component requirement group 69.

The requirements of the components requirement groups 68, 69 are checked for availability. A correlation of the confirmations according to the bill of material structure is performed. This means that the minimum of the availability of a component defines the confirmed quantity for the other components and the result for the header product of the KIT-Product.

Example 3

Using the Following Check Instruction/Control:
  input product—A 50;
    start production indicator—the start production indicator is set equal to 1 (availability check first; then production);
    production type—KIT;
    components—rules based availability check (location and/or product substitutions are performed).

Figure 2F:
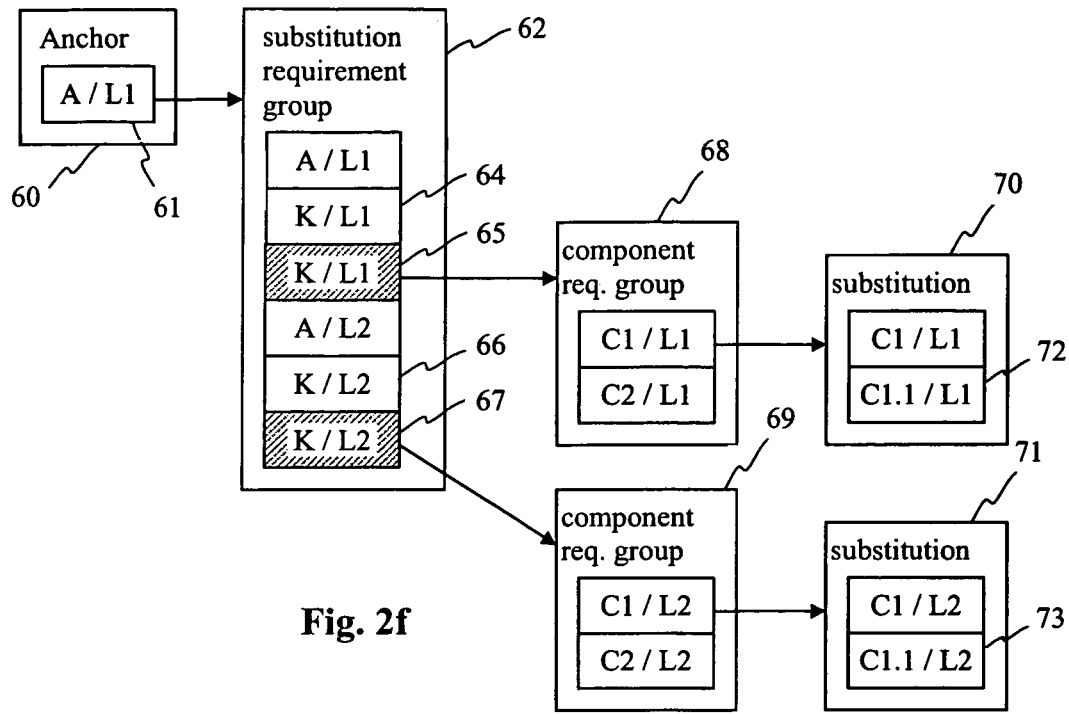

In example 3, the ATP tree is build up as described in example 2. Since a rules based availability check is defined for the components, the ATP rules of the components are evaluated. The result is shown in the example of FIG. 2*f*. Two substitution requirement groups 70, 71 are created, whereby the component C1 is replaced by the component C1.1 72, 73. The substitution requirement groups are inserted into the ATP tree. If a KIT-Product is involved in the substitution chain, the components C1, C2 and C1.1 have to be checked for availability at the same product location as the KIT-Product. This requirement can be realized by using ATP rules without location substitution on component level.

Figure 2G:
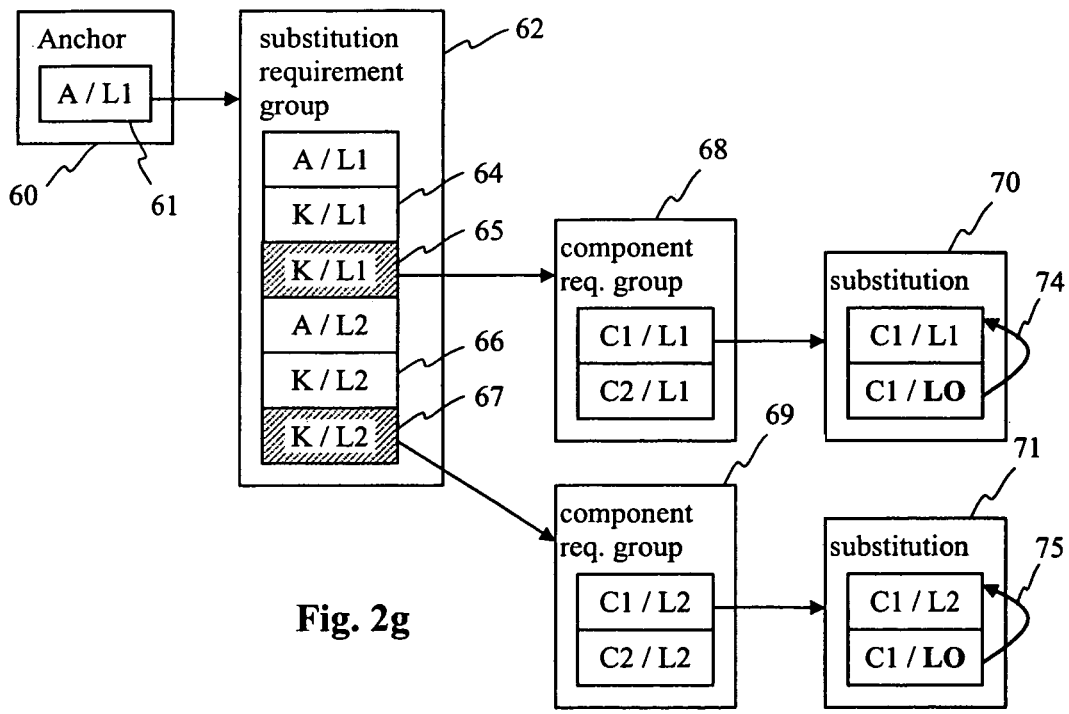

If a location substitution on component level is defined in the ATP rules, a stock transfer requisition is created which triggers the shipments of the components to the product location of the KIT Product. FIG. 2*g* shows the resulting ATP tree when a location substitution on component level is performed. Location L1 and L2 are replaced by location L0. Two stock transfer requisitions 74, 75 are created.

Example 4

Using the Following Check Instruction/Control:
  input product—K 51;
    start production indicator—the start production indicator is set equal to 2 (production directly);
    production type—KIT;
    components—rules based availability check (location and/or product substitutions are performed).

Figure 2H:
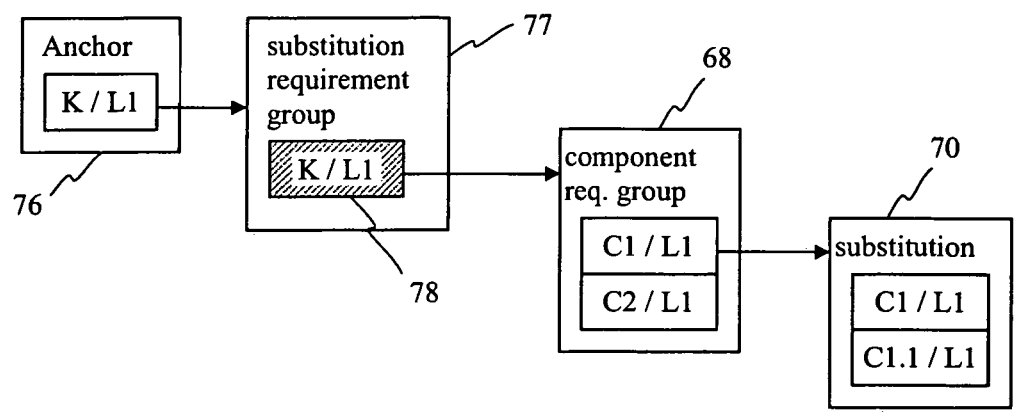

FIG. 2*h* shows the ATP tree according to example 4. First, an anchor requirement group 76 for KIT Product K 51 in location L1 is created. Then, input product K is checked for availability. If there exists a remaining requirement, in the next step a bill of material explosion is performed. It is detected that the bill of material explosion is called from a requirement belonging to the anchor requirement group 76. Therefore, an additional substitution requirement group 77 is created before the bill of material explosion. This requirement group includes the requirement with the remaining quantity according to the first availability check. The following process flow is the same as described above in example 1 to 3.

The following example 5 shows how the ATP tree may be built up when a One-to-Many-Product is involved in the substitution chain. In a One-to-Many substitution, a product is replaced by a group of products. A One-to-Many-Product is represented as a variant product without a header product as described above in FIG. 1*b*. After determining the One-to-Many-Product, the replacements are stored as a bill of material in the internal buffer. Therefore, the process flow is similar to the process flow described above in example 1 to 4 for the KIT-Product. The main difference is that the production type KIT and start production indicator is set automatically.

Figure 3A:
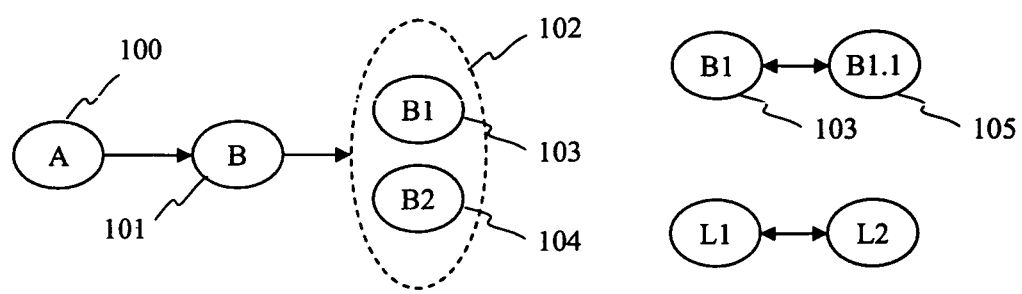
FIGS. 3a-3e illustrate an exemplary creation of an ATP tree for a One-To-Many-Product, consistent with an embodiment of the present invention.
Figure 3B:
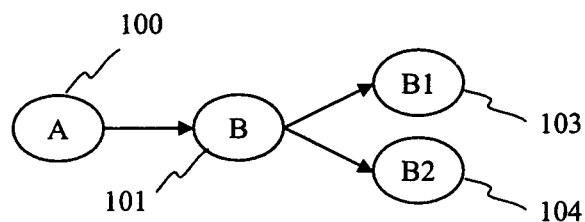

Example 5 is based on the product substitution chain as shown in FIG. 3a. Product A 100 is replaced by the product B 101 which represents the header product of the One-To-Many-Product 102. The One-To-Many-Product 102 is modeled as a variant product using iPPE and includes the components B1 103 and B2 104. Component B1 103 is replaced by the product B1.1 105. Additionally, the location substitution list includes the first location L1 and the second location L2. That means that location L1 is replaced by location L2.

Example 5

Using the Following Check Instruction:
  input product—A 100;
  start production indicator—not relevant;
  substitution product B—no production;
  components B1 and B2—no rules based availability check (location and/or product substitutions are not performed).

First an anchor requirement group for product A 100 in location L1 is created. Then, product A 100 is checked for availability in location L1. The rules evaluation for product A determines the substitution chain shown in FIG. 3b.

The result of the rules evaluation for product A 100 is a location-product list containing the products A 100 and B 101 for the locations L1 and L2, respectively. An additional entry for the product B 101 which is replaced by a group of components 103, 104 and the input location L1 is inserted into the location-product list. For this entry the start production indicator is set equal to 2 (production directly) and the production type is set to KIT automatically by the method. An additional flag, the One-To-Many-Indicator, defines the last entry as 'header' product which is replaced by a group of components and triggers the bill of material explosion.

The following table shows the resulting location-product list.

TABLE 1

| Product | Location | start production indicator | production type | One-To-Many-Indicator |
|---------|----------|----------------------------|-----------------|-----------------------|
| A | L1 | 0 = no production | standard | — |
| B | L1 | 0 = no production | standard | — |
| A | L2 | 0 = no production | standard | — |
| B | L2 | 0 = no production | standard | — |
| $B | L1 | 2 = prod. directly | KIT | One-To-Many |

The location product $B/L1 is denoted as the phantom location product because no master data exists for this location product.

Figure 3C:
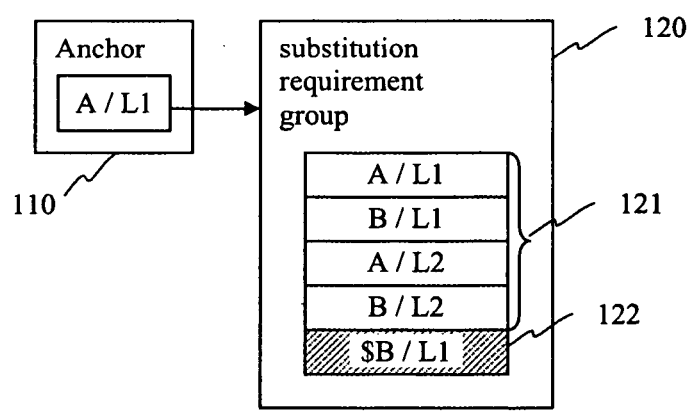
Figure 3D:
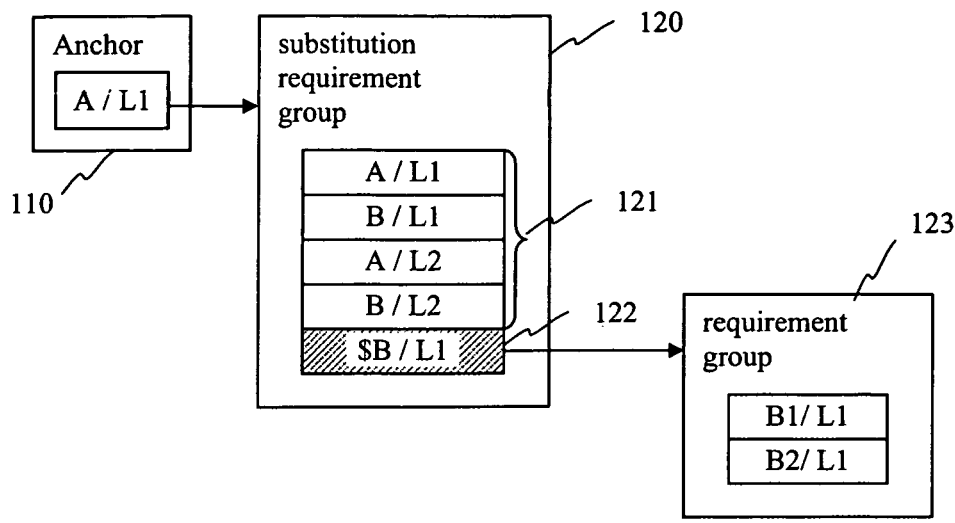
Figure 3E:
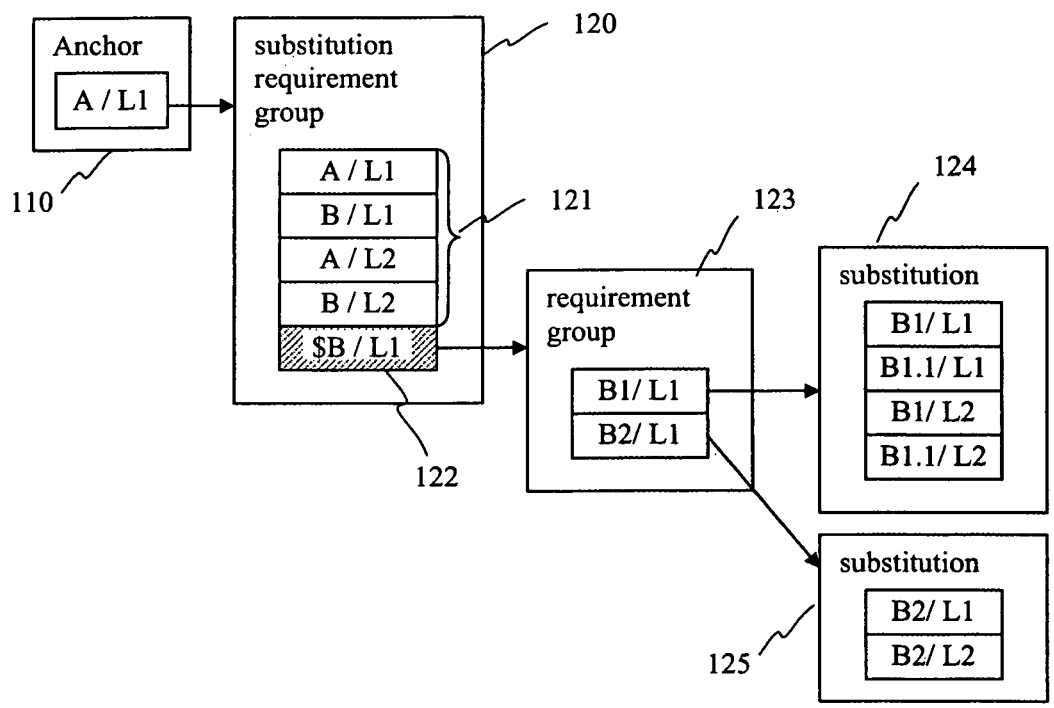

In the next step, a substitution requirement group 120 containing the requirements for all location products 121, 122 is created and inserted as successor of the anchor requirement group into the ATP tree, FIG. 3c. The last requirement 122, the One-To-Many-Placeholder, is the requirement which triggers the bill of material explosion and thus the availability check for the components B1 and B2. The phantom location product 122 must not be checked for availability.

The further process flow is identical to the process flow for the KIT-Product as described in examples 1 to 4. In contrast to the KIT-Product in a One-To-Many substitution, no correlation and no calculation of the minimal confirmed quantity may be accomplished. A new requirement group 123 containing the components B1 and B2 for the One-To-Many-Placeholder 122 is created and inserted into the ATP tree. This leads to the ATP tree shown in FIG. 3d.

If for the components B1 and B2 a rules based availability check is defined, the rules of the components may be evaluated using the condition technique. Applying the product substitution 103, 105 out of FIG. 3a, the method builds up the ATP tree as shown, for example, in FIG. 3e. For both requirements in the requirement group 123, a new substitution group is created 124, 125. The substitution group 125 comprises the location products for the product B2 according to the locations L1 and L2. In this example L1 is replaced by L2. The substitution group 124 additionally comprises the requirements for the product substitution 103, 105 according to the locations L1 and L2. The product B1 103 is replaced by the product B1.1 105.

In the following, the evaluation of the ATP rules is described if a KIT-Product or a One-To-Many-Product is involved in the product substitution chain.

In the case of a One-To-Many-Product, the substitution table includes the phantom product which is substituted by a plurality of components. This phantom product is marked as 'One-To-Many' (the One-To-Many-Indicator above in Table 1). The phantom product controls the One-To-Many substitution. The substitution of the phantom product must be always at the end of the substitution chain. All substitutions after the substitution of the phantom product are ignored. The substitution of the phantom product should exist only one time at the end of the substitution list and only for the first location. When the location product list is generated the substitution to the phantom product is ignored in the first step. After the creation of the product list an additional entry with the phantom product and the first location is inserted into the product list. The start production indicator for this last entry is set equal to 2 (production directly) and the production type is set to KIT. The One-To-Many-Indicator is set to One-To-Many.

The following example 6 shows that for all combinations of the product and location substitution list, the location for the phantom product is always the first location of the location substitution list.

In example 6, the input product is A with the input location L1. Location L1 is replaced by location L2. The product substitution chain is A→B→(B1 and B2). (B1 and B2) represent the components of the phantom product $B.

Product Substitution List:

| Product | Substitute product | One-To-Many-Indicator |
|---------|--------------------|-----------------------|
| A | B | — |
| B | $B | One-To-Many |

Location Substitution List

| Location | Substitute location (target) |
|----------|------------------------------|
| L1 | L2 |

A) location product list—combination of qualified locations with all products

| product | location | start production indicator | Production type | One-To-Many-Indicator |
|---|---|---|---|---|
| A | L1 | 0 = no production | Standard | — |
| B | L1 | 0 = no production | standard | — |
| A | L2 | 0 = no production | standard | — |
| B | L2 | 0 = no production | standard | — |
| $B | L1 | 2 = prod. directly | KIT | One-To-Many |

B) location product list—combination of qualified products with all locations

| product | location | start production indicator | Production type | One-To-Many-Indicator |
|---|---|---|---|---|
| A | L1 | 0 = no production | standard | — |
| A | L2 | 0 = no production | standard | — |
| B | L1 | 0 = no production | standard | — |
| B | L2 | 0 = no production | standard | — |
| $B | L1 | 2 = prod. directly | KIT | One-To-Many |

The bill of material structure for a KIT-Product and a One-To-Many-Product is modeled as a variant product using iPPE. If the product substitution is evaluated and a KIT-Product is involved in the substitution chain also the bill of material is part of the substitution list. The bill of material is represented by the relation of the header product to the components (see also FIGS. 1a and 1b). The relations from the header product to its components are stored in a component list as the bill of material for the header product. For the One-To-Many-Product the same relations are available and stored in the component list.

If a product is checked for availability and for the One-To-Many-Product or the KIT-Product the 'no rules based availability check' is used, then the bill of material does not exist in the internal buffer because the internal buffer for the bill of material is filled by the rules evaluation process. The rules evaluation process is done only if the rules based availability check is used during availability check. If the bill of material does not exist in the internal buffer the bill of material have to be determined directly from die iPPE.

If the availability check of a KIT/One-To-Many-Product does not confirm the requested quantity, the unconfirmed quantity has to be calculated. Whether unconfirmed quantity is calculated or not is customized in the check instruction of the KIT/One-To-Many-Product with a remaining requirements indicator. The remaining requirements indicator may have the following values:
  remaining requirement at header level—'empty';
  remaining requirement at component level (reduce confirmed quantities)—'C';
  remaining requirement at component level (keep confirmed quantities)—'K'.
For the remaining requirements, a requirement group of type 'C' or 'K' is created and inserted into the ATP tree.

Depending on the remaining requirements indicator ('K' or 'C') the components of this requirement group are checked for availability or not.

For a KIT-Product the confirmed quantities of the components are reduced (correlated) according the minimal available component of the KIT-Product.

Example 7

| Product | req./conf. quantity | rem. req. indicator = 'empty' | rem. req. indicator = 'C' | rem. req. indicator = 'K' |
|---|---|---|---|---|
| HP | 10/0 | 7/7 | 7/7 | 7/7 |
|    |      | 3/0 | 3/0 | 3/0 |
| C1 | 10/9 | 7/7 | 7/7 | 7/7 |
|    |      |     | 3/— | 3/2 |
| C2 | 20/14 | 14/14 | 14/14 | 14/14 |
|    |       |       | 6/— | 6/0 |

According to the remaining requirement indicator='empty' (third column) the remaining requirement for the header product HP is determined (3/0). At component level no remaining requirements are generated.

According to the remaining requirement indicator='C' (fourth column) the remaining requirement for the header product HP and the remaining requirements for the components C1 and C2 are determined (3/– for C1 and 6/– for C2). If the remaining requirement indicator is set to 'K', the remaining requirement for the header product HP and the remaining requirements for the components C1 and C2 are determined whereby components keep their confirmations (3/2 for C1 and 6/0 for C2). The requested quantity of component C1 is 10. The availability check of C1 confirms a quantity of 9. Since the confirmed quantities are correlated according to the minimal available component (C2) the confirmed quantity of C1 is reduced to 7. Therefore, for component C1 exists a remaining available quantity of 2 components which is determined by checking the availability of the remaining requirement.

For a One-To-Many-Product, the unconfirmed quantities of the components stay with every component. Since the components of a One-To-Many-Product are not correlated according to the minimal available component, no confirmed quantity for the header product can be created. This is shown in the following table:

| Product/Location | req. qty. | conf. qty. | Explanation |
|---|---|---|---|
| A/L1 | 10 | ? | header product (One-to-Many) |
| C1/L1 | 10 | 8 | component 1 |
| C1/L1 | 4 | 4 | substitution 1 for C1 |
| C1/L2 | 4 | 4 | substitution 2 for C1 |
| C1/L1 | 2 | 0 | remaining requirement for C1 |
| C2/L1 | 10 | 10 | component 2 (fully confirmed) |
| C3/L1 | 10 | 0 | component 3 (no confirmation at all) |
| C4/L1 | 10 | 7 | component 4 (partially confirmed) |

For the remaining requirement for C1 an additional requirement group is created and inserted into the ATP tree.

The results and the multi-level structure (the ATP tree) of the results of an availability check are passed to the calling system, for example to an order entry system. The availability check may be called synchronously to perform an availability check for one or several requirements of the order entry system. During the availability check new requirements may be created by rules based availability check. New requirements are created especially if One-To-Many-Products or KIT-Products are involved in the substitution chain. These new requirements together with the requirements coming from the order entry system and the results and the relationships between all the requirements are transferred back to the order entry system using the following interface tables, whereby the names of the tables in this disclosure are exemplary:

REQ_GROUPS
REQ
REQ_ITEMS
RES

Table REQ_GROUPS is used for storing the requirement groups, the table REQ for storing the requirements, the table REQ_ITEMS for storing the requirement items and the table RES for storing the results representing the confirmations of the availability checks. The quantity factor is stored with each requirement. The quantity factor is calculated during the rules evaluation. This quantity factor is then considered by the availability check. To avoid rounding problems the quantity factor is stored as a fraction with the fields QTY_FACTOR and QTY_DIVISOR. The interface table REQ includes these two fields.

Figure 4:
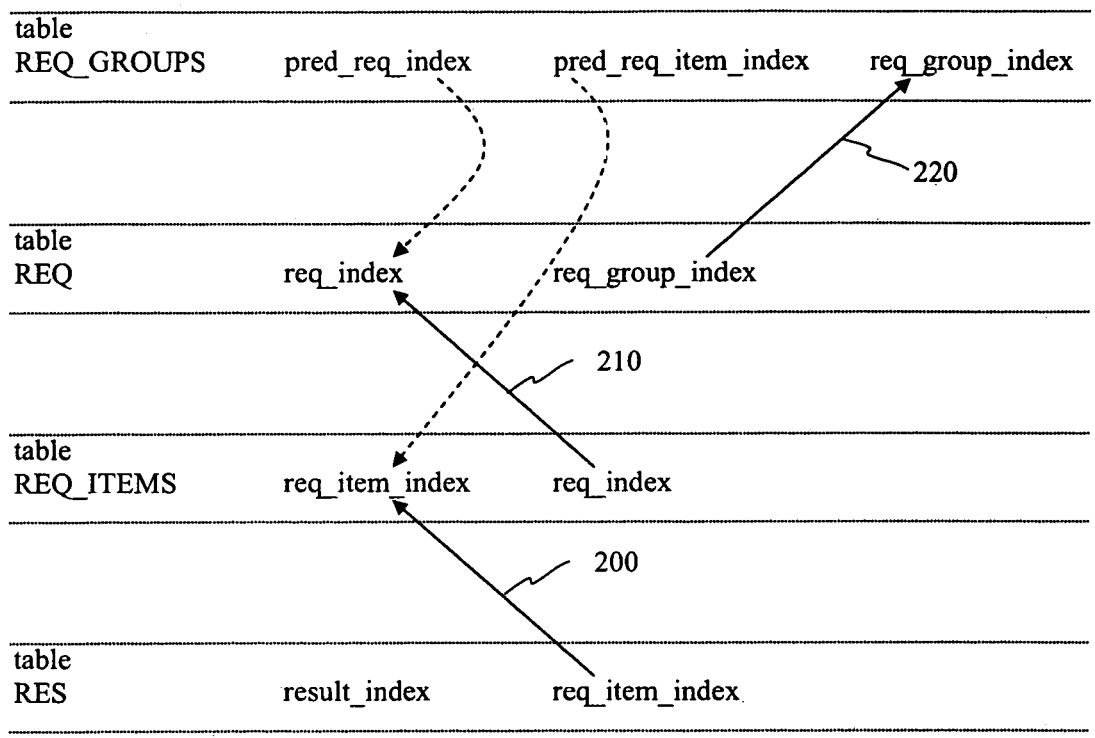
FIG. 4 illustrates an exemplary relationship of interface tables, consistent with an embodiment of the present invention.

The table REQ_GROUPS, REQ, REQ_ITEMS and RES are linked together with indices as shown in FIG. 4. Successor requirement groups are linked with its predecessor requirements or requirement items respectively also with indices (dashed arrows). The results are linked 200 with its requirement items, the requirement items are linked 210 with its requirements and the requirements are linked 220 with its requirements groups. With this table structure it is also possible to model deep nested structures which can occur for KIT-Products or One-To-Many-Products especially if a component of a KIT-Product or a One-To-Many-Product have to be replaced by a further KIT-Product or One-To-Many-Product.

The ATP-trees as described above for the KIT-Products or One-To-Many-Products are mapped to these interface tables. The mapping may be done recursively. Furthermore, these interface table may be used for updating the customer order by replacing the order items with the structured order items.

It is clear that instead of the interface tables XML structures and XML files may be used for storing the respective data.

The following two examples 8 and 9 show the interface tables for a KIT-Product and a One-To-Many-Product.

Example 8

Kit-Product

A customer requests product A with required quantity=10. Product A is a KIT Product and the availability check confirms directly 4 KIT Products in location L1. For the remaining 6 pieces the KIT Product is exploded into components A1 (6 pieces needed) and A2 (12 pieces needed). The quantity factor for A2 is two (12/6). The availability check confirms all 6 pieces A1. For A2 only 6 pieces can be confirmed and for the remaining 6 pieces the rules evaluation is performed which lead to the substitution product B2 which confirms the rest of 6 pieces.

In this example the following output data is transferred to the order entry system.

TABLE REQ

| req_index | req_group_index | product | location | QTY_FACTOR | QTY_DIVISOR |
|---|---|---|---|---|---|
| 1 | 1 | A | L1 | 1 | 1 |
| 2 | 2 | A | L1 | 1 | 1 |
| 3 | 2 | A | L1 | 1 | 1 |
| 4 | 3 | A1 | L1 | 1 | 1 |
| 5 | 3 | A2 | L1 | 2 | 1 |
| 6 | 4 | A2 | L1 | 1 | 1 |
| 7 | 4 | B2 | L1 | 1 | 1 |

TABLE REQ_ITEMS

| req_item_index | req_index | required quantity |
|---|---|---|
| 1 | 1 | 10 |
| 2 | 2 | 4 |
| 3 | 3 | 6 |
| 4 | 4 | 6 |
| 5 | 5 | 12 |
| 6 | 6 | 6 |
| 7 | 7 | 6 |

TABLE RES

| req_item_index | result_index | confirmed quantity |
|---|---|---|
| 1 | 1 | 0 |
| 2 | 5 | 4 |
| 3 | 10 | 6 |
| 4 | 15 | 6 |
| 5 | 20 | 0 |
| 6 | 25 | 6 |
| 7 | 30 | 6 |

TABLE REQ_GROUPS

| pred_req_index | pred_req_item_index | req_group_index | type |
|---|---|---|---|
| 0 | 0 | 1 | anchor |
| 1 | 1 | 2 | substitution |
| 3 | 3 | 3 | KIT |
| 5 | 5 | 4 | substitution |

The corresponding order in the entry system looks as follows.

| Order # | Item # (Parent #) | Product/ Location | requested qty. | confirmed qty. |
|---|---|---|---|---|
| 4711 | 10 | A/L1 | 10 | 4 + 6 |
|  | 20 (10) | A/L1 | 4 | 4 |
|  | 30 (10) | A/L1 | 6 | 6 |

-continued

| Order # | Item # (Parent #) | Product/Location | requested qty. | confirmed qty. |
|---|---|---|---|---|
| | 40 (30) | A1/L1 | 6 | 6 |
| | 50 (30) | A2/L1 | 12 | 12 |
| | 60 (50) | A2/L1 | 6 | 6 |
| | 70 (50) | B2/L1 | 6 | 6 |

Example 9

One-To-Many-Product

A customer requests product E with required quantity=10. Product E is checked for availability in location L1 and 4 pieces are confirmed. For the remaining quantity of 6 pieces a rules evaluation is performed which lead to the substitution product A in location L1. Product A is a One-To-Many-Product and so substituted by 6 pieces of product B and 6 pieces of product C which are both checked for availability in location L1. For product B all 6 pieces are confirmed, for product C only 2 are confirmed and for the remaining 4 pieces of product C a rules evaluation is performed which lead to an alternative location L2. With the alternative location L2 the remaining 4 pieces are confirmed.

In this example the following output data is transferred to the order entry system.

TABLE REQ

| req_index | req_group_index | product | location | QTY_FACTOR | QTY_DIVISOR |
|---|---|---|---|---|---|
| 1 | 1 | E | L1 | 1 | 1 |
| 2 | 2 | E | L1 | 1 | 1 |
| 3 | 2 | A | L1 | 1 | 1 |
| 4 | 3 | B | L1 | 1 | 1 |
| 5 | 3 | C | L1 | 1 | 1 |
| 6 | 4 | C | L1 | 1 | 1 |
| 7 | 4 | C | L2 | 1 | 1 |

TABLE REQ_ITEMS

| req_item_index | req_index | required quantity |
|---|---|---|
| 1 | 1 | 0 |
| 2 | 2 | 4 |
| 3 | 3 | 6 |
| 4 | 4 | 6 |
| 5 | 5 | 0 |
| 6 | 6 | 2 |
| 7 | 7 | 4 |

TABLE RES

| req_item_index | result_index | confirmed quantity |
|---|---|---|
| 1 | 1 | 0 |
| 2 | 5 | 4 |
| 3 | 10 | 0 |
| 4 | 15 | 6 |
| 5 | 20 | 0 |
| 6 | 25 | 2 |
| 7 | 30 | 4 |

TABLE REQ_GROUPS

| pred_req_index | pred_req_item_index | req_group_index | Type |
|---|---|---|---|
| 0 | 0 | 1 | Anchor |
| 1 | 1 | 2 | Substitution |
| 3 | 3 | 3 | One-To-Many |
| 5 | 5 | 4 | Substitution |

The corresponding order in the order entry system looks as follows.

| Order # | Item # (Parent #) | Product/Location | requested qty. | confirmed qty. |
|---|---|---|---|---|
| 4711 | 10 | E/L1 | 10 | 4 + ? |
| | 20 (10) | E/L1 | 4 | 4 |
| | 30 (10) | A/L1 | 6 | ? |
| | 40 (30) | B/L1 | 6 | 6 |
| | 50 (30) | C/L1 | 6 | 2 + 4 |
| | 60 (50) | C/L1 | 2 | 2 |
| | 70 (50) | C/L2 | 4 | 4 |

As described above, the confirmed quantity of the One-To-Many-Product A cannot be calculated. Therefore, the column 'confirmed qty.' stores a '?' as confirmed quantity for product A. Since the confirmed quantity of the One-To-Many-Product A cannot be calculated the confirmed quantity of the header product E (item#10) is 4+?, the sum of items 20 and 30.

Figure 5:
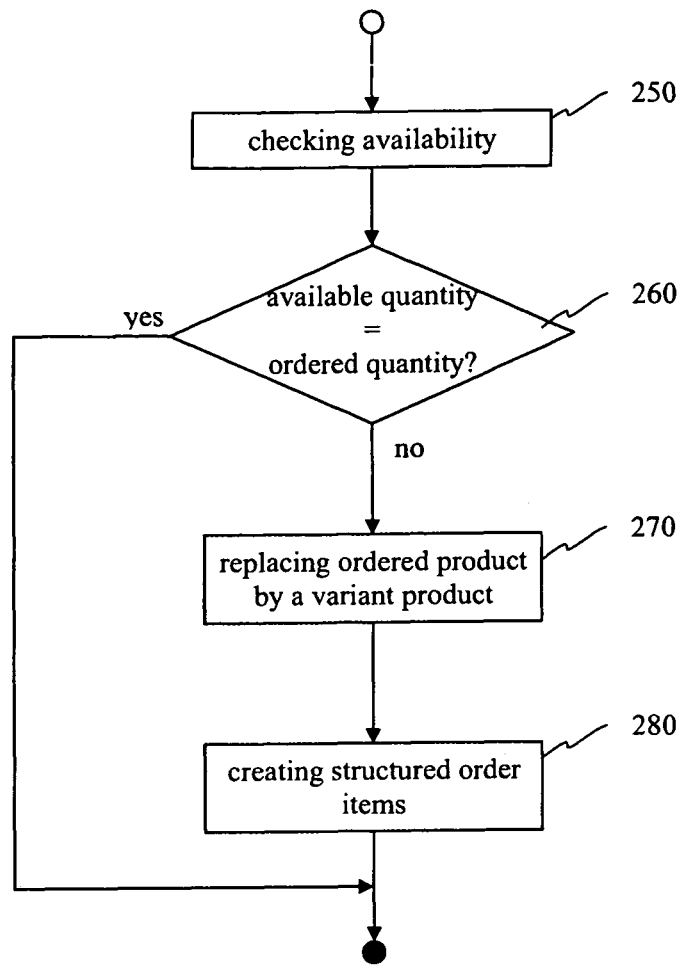
FIG. 5 illustrates a flow diagram of an exemplary method, consistent with an embodiment of the present invention.

FIG. 5 shows a flow diagram of an exemplary method, consistent with an embodiment of the present invention. In a first step 250, an availability check for the ordered products is carried out. The result of step 250 is verified in the following step 260 which checks whether the available quantity of products is equal to the ordered quantity of products. If the available quantity of products corresponds to the ordered quantity of products, the method terminates by returning the result.

Otherwise, the method continues with step 270. In step 270, the ordered product is replaced by a variant product. The variant product may be a One-To-Many-Product or a KIT-Product. The components of the variant product are checked for availability and structured order items are created within the next step 280. The steps 270 and 280 are described more detailed in the following figures FIG. 6-FIG. 9. Finally, the method returns the structured order items to the calling system.

Figure 6:
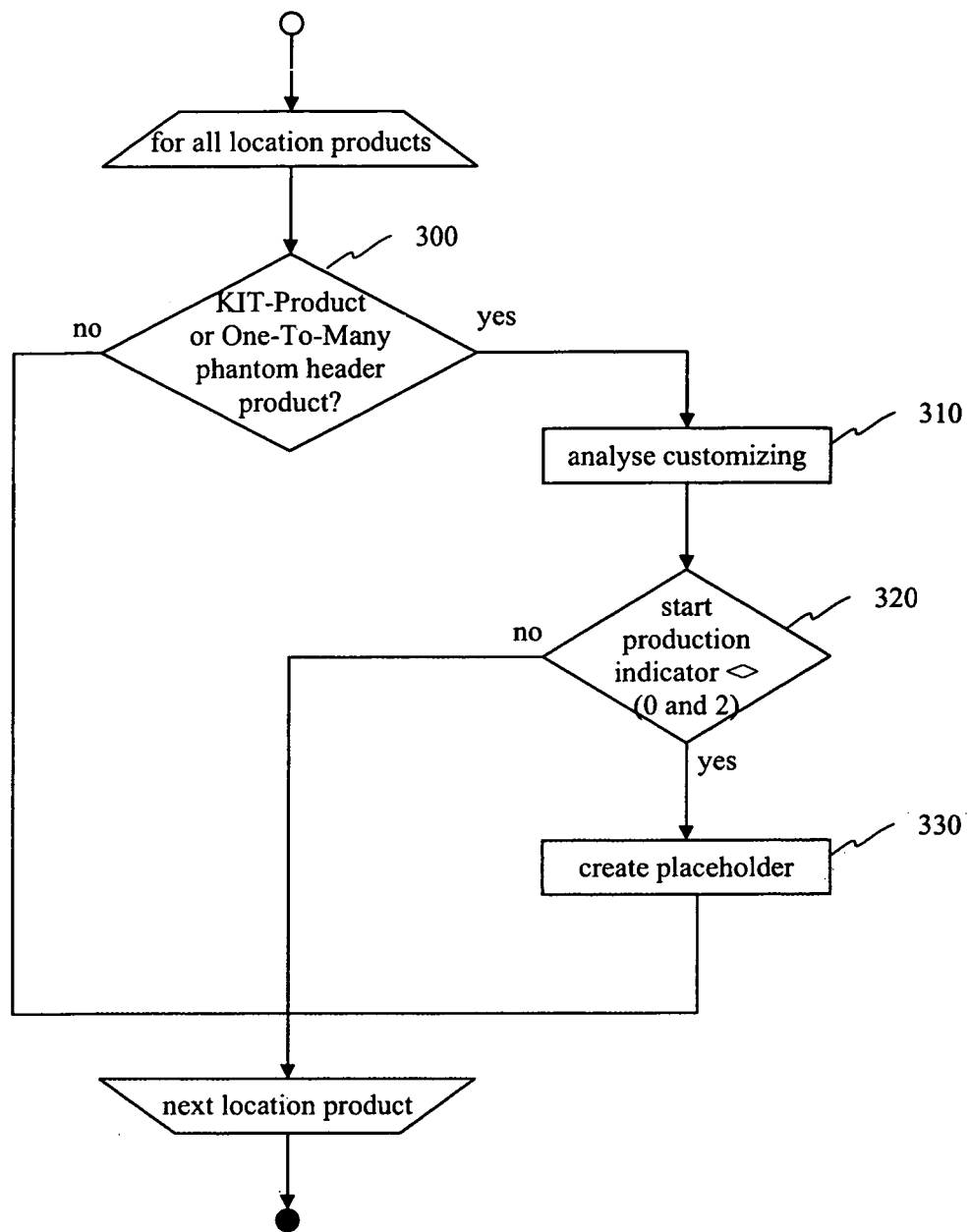
FIG. 6 illustrates a flow diagram for an exemplary method of creating placeholder requirements, consistent with an embodiment of the present invention.

FIG. 6 shows a program flow of an exemplary method for creating the placeholder requirement for a KIT-Product or a One-To-Many-Product. This processing makes sure that the requirements for the KIT-Product header or the One-To-Many-Product phantom header are generated as described above.

All entries in the substitution table have to be checked in step 300 for KIT-Product or One-To-Many phantom header product. If the entry is not a KIT-Product or One-To-Many phantom header product, the method continues by checking the next entry. Otherwise step 310 is performed. In Step 310, for the KIT-Product or One-To-Many phantom header product the customizing is analyzed in order to find out if production type is set to 'KIT'. In the following step 320 the method checks if the start production indicator is set equal to 1. Step 330 must not be performed if start production indicator is set equal to 0 or 2 (production directly or availability check only; no production) because only one requirement for the KIT-Product or One-To-Many phantom header product has to be created. If start production indicator is set equal to 1, step 330 is performed which creates the placeholder requirement in the result table for the KIT-Product or the One-To-Many-Product.

Figure 7:
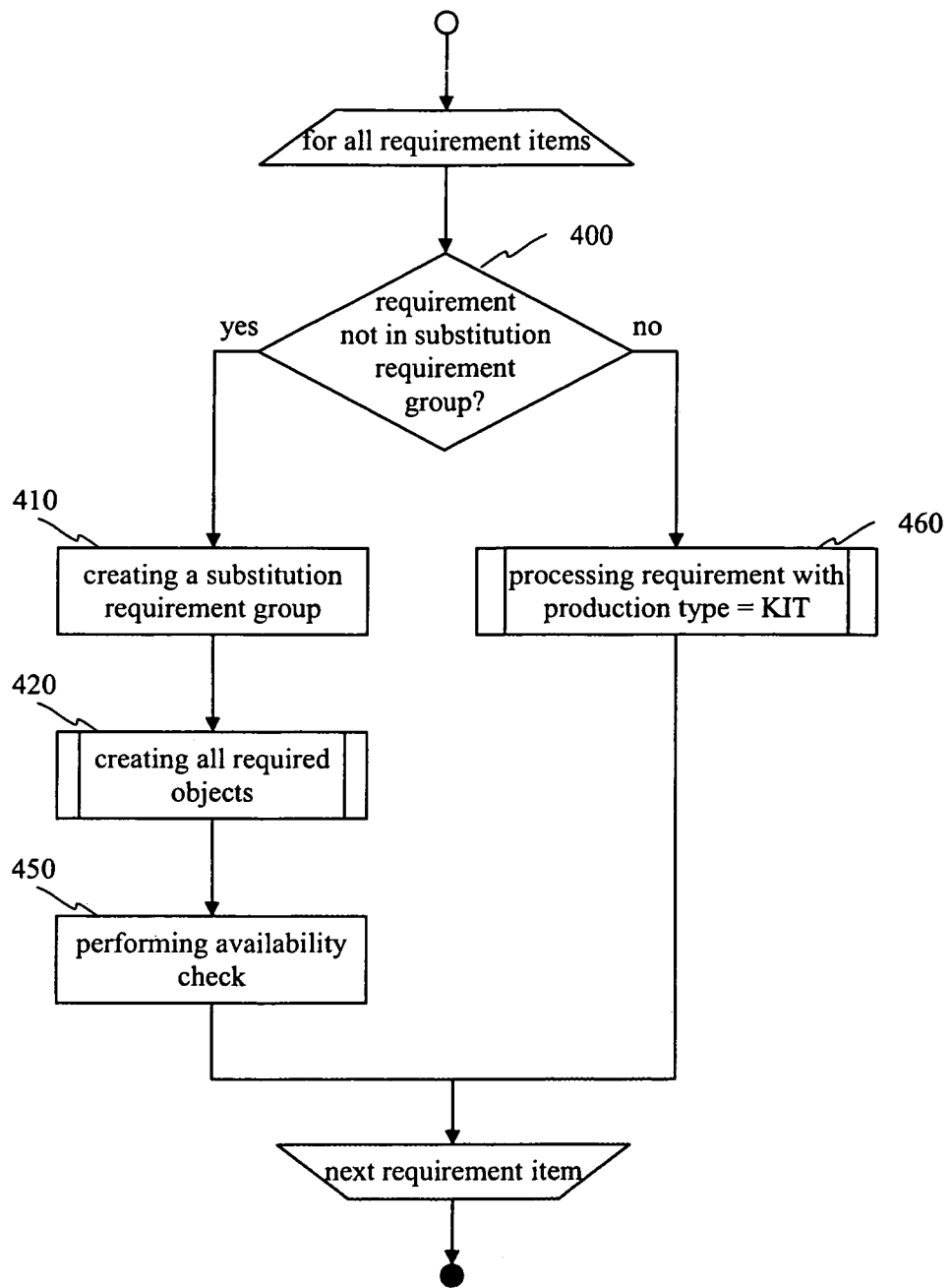
FIG. 7 illustrates a flow diagram for an exemplary method for processing requirement items, consistent with an embodiment of the present invention.

FIG. 7 shows a program flow of an exemplary method for processing all requirement items according to a KIT-Product or a One-To-Many-Product.

In step 400, it is checked whether the requirement belongs to a substitution requirement group or not. If the requirement does not belongs to a substitution requirement group the method continues with step 410, otherwise with step 460. Within step 410 a substitution requirement group is created which will include the requirements from the header product.

In the next step 420, all necessary objects for the created substitution requirement group are created. For this purpose the process described in FIG. 6 is called as a sub method within step 420. After creating all necessary objects, the method performs within the next step 450 an availability check for the new created substitution requirement group.

Within step 460, i.e., the requirement belongs to a substitution requirement group, the requirement item with production type KIT is checked for production (bill of material explosion and availability check of the components). This step 460 is shown more detailed in the example of FIG. 8.

Figure 8:
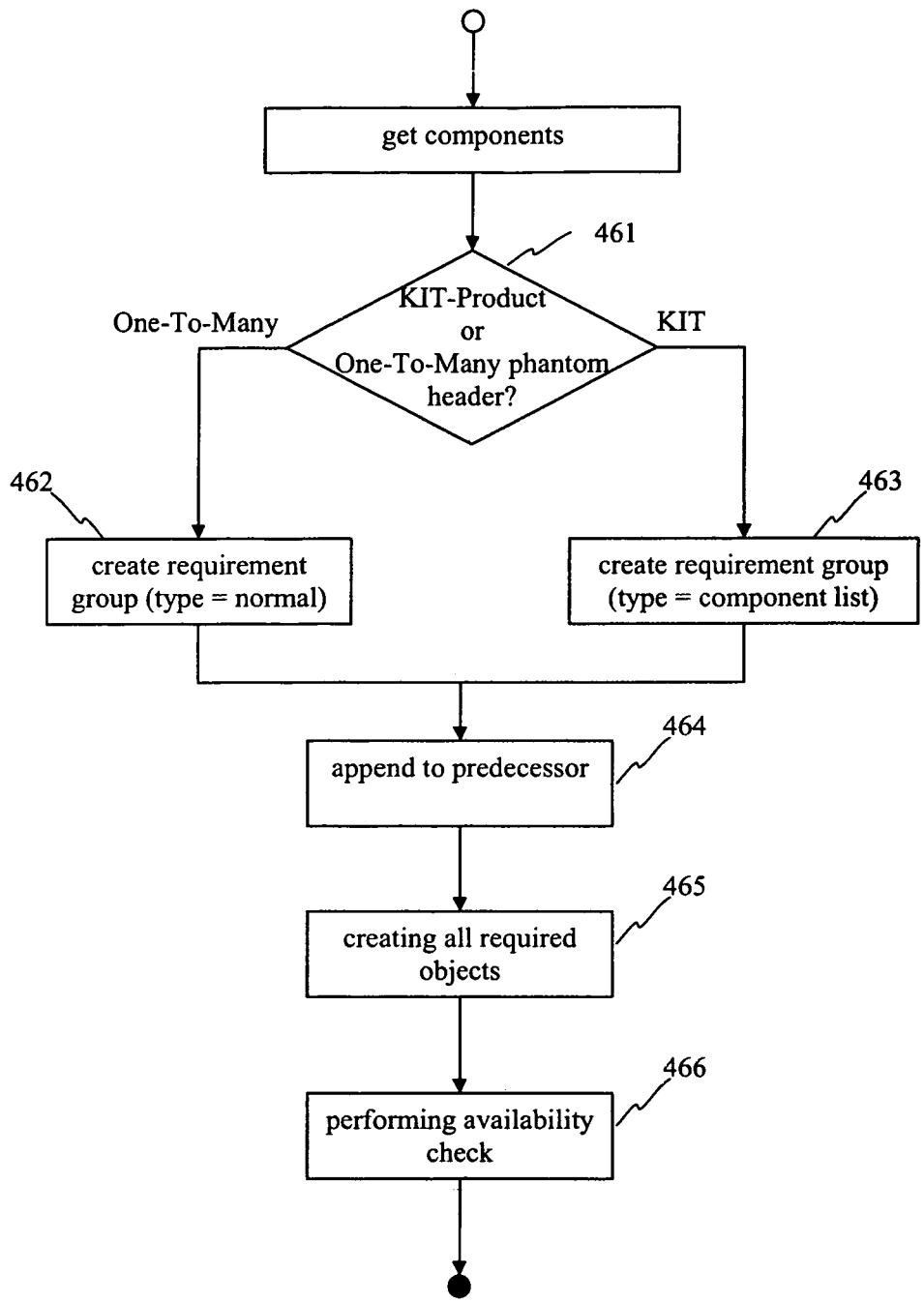
FIG. 8 illustrates a flow diagram for an exemplary method for checking the requirement items for production, consistent with an embodiment of the present invention.

The program flow shown in FIG. 8 starts with step 461 by reading the components for the KIT header or the One-To-Many phantom header. Within the next step 461, the method checks if the header product is a header of a KIT-Product or a One-To-Many-Product. In the case that the header product is a header of a KIT-Product step 463 is carried out. In step 463, a requirement group with type 'component list' is created. Otherwise, if header product is a One-To-Many-Product, the methods performs step 462 which creates a requirement group with type 'normal.'

Both steps 462 and 463 are followed by step 464 which appends the just created requirement group to the parent requirement item. In following step 465 all necessary objects for the kit component structure are generated. Finally, in step 466 the availability check for the created requirement group is executed.

Figure 9:
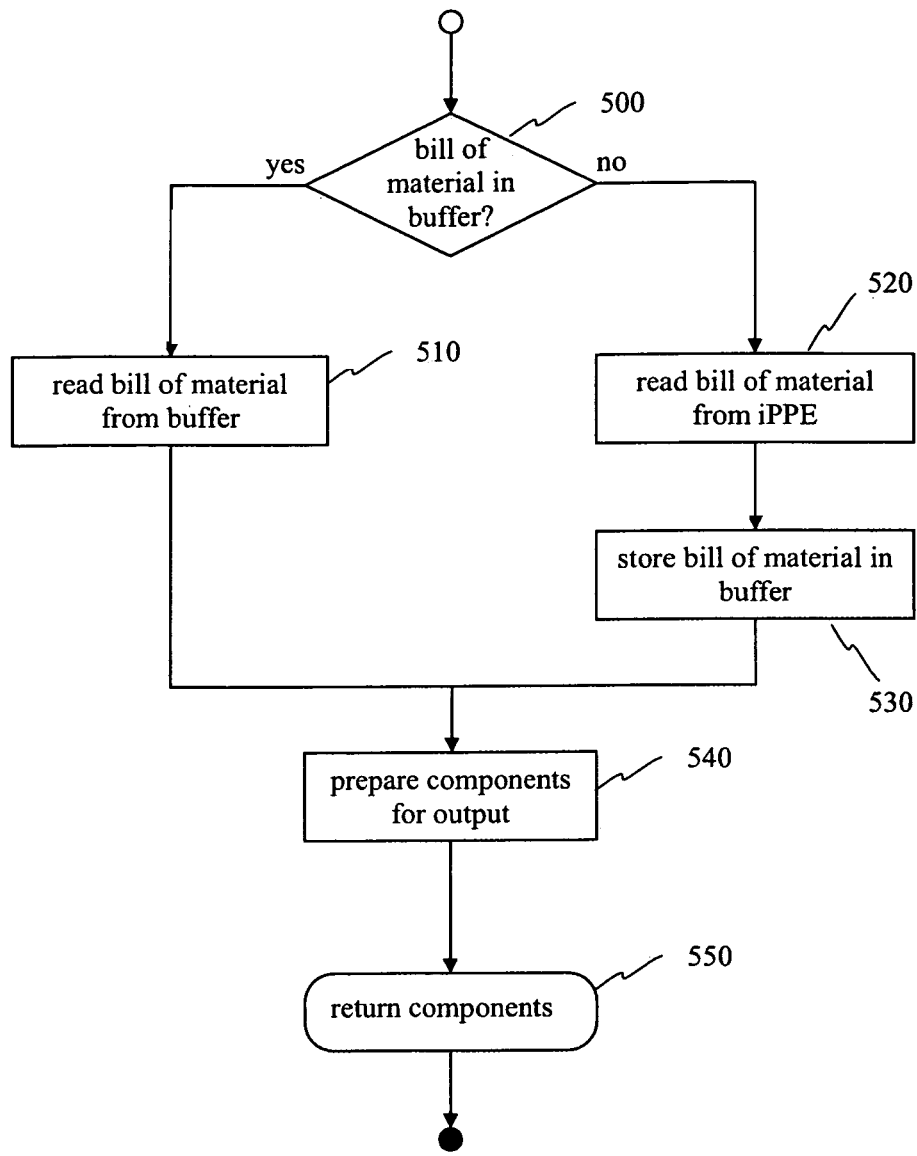
FIG. 9 illustrates a flow diagram for a bill of material explosion, consistent with an embodiment of the present invention.

FIG. 9 shows an exemplary program flow of the bill of material explosion. In the first step 500, the method checks whether or not an instance of a bill of material exists in the internal buffer. If a bill of material for a product is read before and a KIT-Product or a One-To-Many-Product is involved in the substitution chain than an instance for the product exists in the internal buffer which represents the bill of material for this product. If the bill of material exists in the buffer step 510 is performed as the next otherwise step 520.

In step 510, the components of the bill of material are read from internal buffer. In step 520, the bill of material must be read from the iPPE. The result of this reading process is a list which includes the header product and the components according to this header product. This list is stored in the internal buffer in step 530.

In the next step 540, the components determined in step 510 and 520 are prepared for output. In the last step 550 the components and the header product are returned to the calling system or method.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to embodiments of the invention can be performed by a programmable processor executing a program of instructions to perform functions of the invention by operating on the basis of input data, and by generating output data. Embodiments of the invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, embodiments of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for creating and managing structured order items according to a customer order within a supply chain management system, the customer order specifying a plurality of products and required quantities thereof, the method comprising:
    comparing, by a computer processor, an available quantity of an ordered product with an ordered quantity of the ordered product;
    creating, by the computer processor, a substitution requirement group indicating a variant product as a substitute for the ordered product, if the available quantity of the ordered product does not correspond to the ordered quantity of the ordered product, the variant product comprising a plurality of component products and being associated with a product type indicator and a start production indicator;
    determining whether a required quantity of the variant product is confirmed based on the ordered quantity and the available quantity;
    determining the plurality of component products according to the product type indicator of the variant product, if the required quantity of the variant product is not confirmed and the product type indicator has a predetermined type value;
    performing an availability check for the component products according to the start production indicator of the variant product, to determine whether the required quantity of the component products can be confirmed, if the start production indicator has a predetermined start production value;
    determining at least one alternative product for the component products if the availability check does not confirm the required quantity of the component products;
    performing an availability check for the at least one alternative product;
    creating, by the computer processor, structured order items according to the variant product and the component products, the structured order items being arranged in a tree structure comprising the ordered product, the variant products, the component products, the alternative products, and the relationships among them; and
    updating, by the computer processor, the customer order by linking the ordered product with the structured order items.

2. The computer-implemented method of claim 1, wherein determining the at least one alternative product for the component products is performed based on a plurality of available-to-promise (ATP) rules, the ATP rules comprising at least one of product substitutions or location substitutions.

3. The computer-implemented method of claim 2, wherein the component products comprise a further variant product.

4. The computer-implemented method of claim 1, wherein the start production indicator indicates that one of the following actions is to be performed on the variant product:
    availability check only and no production;
    availability check first and then production; or
    production directly.

5. The computer-implemented method of claim 1, wherein the substitution requirement group comprises a quantity factor indicating the number of component products per variant product.

6. The computer-implemented method of claim 1, wherein:
    the product type indicator indicates that the variant product is one of:
        a KIT product, or
        a One-To-Many product; and
    the method further comprises:
        defining a rule-based availability check process based on available-to-promise (ATP) rules; and
        determining the availability of the variant product and the component products in accordance with the rule based availability check process.

7. The computer-implemented method of claim 6, further comprising:
    determining that the variant product is a type of the KIT product according to the product type indicator, the variant product having a header product;
    indicating the variant product is available as a substitute for the ordered product only when all the component products required by the variant product are available within one product location; and
    linking the ordered product with the header product of the variant product.

8. The computer-implemented method of claim 6, further comprising:
    determining that the variant product is a type of the One-To-Many product according to the product type indicator; and
    linking the ordered product directly with the component products.

9. The computer-implemented method of claim 4, further comprising:
    determining that the start production indicator is set to availability check first and then production;
    creating a placeholder requirement for the variant product;
    initiating a bill of material explosion for the placeholder requirement; and
    performing an availability check on each of the component products in accordance with the bill of material explosion.

10. The computer-implemented method of claim 7, wherein:
    the component products are correlated according to the KIT product, the method further comprising:
    determining one of the component products that has a minimum confirmed quantity; and
    determining required quantities of remaining ones of the component products and a confirmed quantity of the variant product in accordance with the correlation of the component products.

11. The computer-implemented method of claim 2, wherein a stock transfer order is carried out, if a location substitution according to the ATP rules is performed during determination of the at least one alternative product for the component product.

12. The computer-implemented method of claim 11, further comprising:
    creating an ATP tree in accordance with the ATP rules, the ATP tree including an anchor item representative of the ordered product;
    inserting substitution requirements as placeholders for the variant product into the substitution requirement group;
    if the component products require additional variant products, creating component requirement groups for the placeholders comprising additional substitution requirements for the corresponding additional variant products;
    linking the placeholders to the corresponding component requirement groups;
    creating additional substitution requirement groups for the additional substitution requirements; and
    linking the substitution requirements to the corresponding additional substitution requirement groups.

13. The computer-implemented method of claim 12, wherein updating the customer order comprises storing the ATP tree in a plurality of interface tables.

14. The computer-implemented method of claim 13, wherein the plurality of interface tables comprise at least:
    a requirement group table for storing requirement groups,
    a requirement table for storing requirements,
    a requirement item table for storing requirement items, and
    a result table for storing check results representing confirmations of the availability checks.

15. The computer-implemented method of claim 14, wherein the plurality of interface tables are linked together using a plurality of indices, wherein:
    the result table is linked to requirement item table,
    the requirement item table is linked to the requirement table,
    the requirement table is linked to the requirement group table, and
    the requirement group table is linked to the anchor item.

16. A computer-readable medium comprising computer-executable instructions that, when executed by a computer processor, instruct the computer processor to perform a method comprising:
    comparing, by a computer processor, an available quantity of an ordered product with an ordered quantity of the ordered product;
    creating, by the computer processor, a substitution requirement group indicating a variant product as a substitute for the ordered product, if the available quantity of the ordered product does not correspond to the ordered quantity of the ordered product, the variant product comprising a plurality of component products and being associated with a product type indicator and a start production indicator;
    determining whether a required quantity of the variant product is confirmed based on the ordered quantity and the available quantity;
    determining the plurality of component products according to the product type indicator of the variant product, if the required quantity of the variant product is not confirmed and the product type indicator has a predetermined type value;
    performing an availability check for the component products according to the start production indicator of the variant product, to determine whether the required quantity of the component products can be confirmed, if the start production indicator has a predetermined start production value;
    determining at least one alternative product for the component products if the availability check does not confirm the required quantity of the component products;
    performing an availability check for the at least one alternative product;
    creating, by the computer processor, structured order items according to the variant product and the component products, the structured order items being arranged in a tree structure comprising the ordered product, the variant products, the component products, the alternative products, and the relationships among them; and
    updating, by the computer processor, the customer order by linking the ordered product with the structured order items.

17. The computer-readable medium of claim 16, wherein performing the availability check for the component products comprises:
    determining at least one alternative product for the component products if the availability check does not confirm the required quantity of the component products; and
    performing an availability check for the at least one alternative product.

18. The computer-readable medium of claim 17, wherein determining the at least one alternative product for the component products is performed based on a plurality of ATP rules, the ATP rules comprising at least one of product substitutions or location substitutions.

19. The computer-readable medium of claim 18, wherein the component products comprise a further variant product.

20. The computer-readable medium of claim 16, wherein the start production indicator indicates that one of the following actions is to be performed on the variant product:
    availability check only and no production;
    availability check first and then production; or
    production directly.

21. The computer-readable medium of claim 20, wherein the method further comprises:
    determining that the start production indicator is set to availability check first and then production;
    creating a placeholder requirement for the variant product;
    initiating a bill of material explosion for the placeholder requirement; and
    performing an availability check on each of the component products in accordance with the material explosion.

22. The computer-readable medium of claim 16, wherein:
the product type indicator indicates that the variant product is one of:
    a KIT product, or
    a One-To-Many product; and
the method further comprises:
    defining a rule-based availability check process based on available-to-promise (ATP) rules; and
    determining the availability of the variant product and the component products in accordance with the rule based availability check process.

23. The computer-readable medium of claim 22, the method further comprising:
- determining that the variant product is a type of the KIT product according to the product type indicator, the variant product having a header product;
- indicating the variant product is available as a substitute for the ordered product only when all the component products required by the variant product are available within one product location; and
- linking the ordered product with the header product of the variant product.

* * * * *